US011914700B2

(12) United States Patent
Lewis et al.

(10) Patent No.: US 11,914,700 B2
(45) Date of Patent: Feb. 27, 2024

(54) REDUCING REMOTE PROCEDURE CALLS FOR MULTIMEDIA CONTENT DELIVERY

(71) Applicant: Google LLC

(72) Inventors: Justin Lewis, Marina Del Rey, CA (US); Richard Rapp, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 826 days.

(21) Appl. No.: 16/605,157

(22) PCT Filed: Aug. 22, 2017

(86) PCT No.: PCT/US2017/047972
§ 371 (c)(1),
(2) Date: Oct. 14, 2019

(87) PCT Pub. No.: WO2019/040048
PCT Pub. Date: Feb. 28, 2019

(65) Prior Publication Data
US 2021/0150020 A1 May 20, 2021

(51) Int. Cl.
G06F 21/53 (2013.01)
G06F 9/54 (2006.01)
(Continued)

(52) U.S. Cl.
CPC ............. G06F 21/53 (2013.01); G06F 9/547 (2013.01); H04L 67/568 (2022.05); H04L 67/60 (2022.05); G06F 2221/033 (2013.01)

(58) Field of Classification Search
CPC .... G06F 21/53; G06F 9/547; G06F 2221/033; G06F 16/9574; H04L 67/2842; H04L 67/32; H04L 67/568
(Continued)

(56) References Cited

U.S. PATENT DOCUMENTS

2003/0229718 A1* 12/2003 Tock ..................... H04L 63/168
709/246
2006/0064467 A1* 3/2006 Libby ................. G06F 16/9577
709/217
(Continued)

FOREIGN PATENT DOCUMENTS

WO WO-2016141079 A2 * 9/2016 ....... G06F 17/30902

OTHER PUBLICATIONS

International Search Report and Written Opinion on PCT Appln. Ser. No. PCT/US2017/047972 dated Apr. 18, 2018 (14 pages).
(Continued)

Primary Examiner — Esther B. Henderson
(74) Attorney, Agent, or Firm — MARSHALL, GERSTEIN & BORUN LLP

(57) ABSTRACT

Systems and methods of reducing remote procedure calls in multimedia content delivery are described. A client device can request and receive digital content for presentation via an application executing on the client device in a sandboxed media environment. A markup interpreter executing on the client device can intercept, prior to receipt by the application executing in the sandboxed media environment, the content item. The markup interpreter can parse the content item to extract an identifier of a script. The markup interpreter can identify the script stored in a local cache on the client device separate from the sandboxed media environment. The markup interpreter can construct a modified content item. The markup interpreter can forward the modified content item to the application executing on the client device in the sandboxed media environment to cause the application to execute the modified content item.

20 Claims, 5 Drawing Sheets

(51) Int. Cl.
*H04L 67/568* (2022.01)
*H04L 67/60* (2022.01)

(58) Field of Classification Search
USPC .......................................................... 726/22
See application file for complete search history.

(56) References Cited

U.S. PATENT DOCUMENTS

| | | | | |
|---|---|---|---|---|
| 2012/0311702 A1* | 12/2012 | Krstic | ................... | G06F 21/53 |
| | | | | 726/22 |
| 2013/0185623 A1* | 7/2013 | Wicker | ................ | H04L 63/168 |
| | | | | 715/234 |
| 2013/0198459 A1* | 8/2013 | Joshi | ................... | G06F 12/0891 |
| | | | | 711/130 |
| 2014/0006548 A1* | 1/2014 | Tsolis | ................... | G06F 16/95 |
| | | | | 709/217 |
| 2014/0033019 A1 | 1/2014 | Zhang et al. | | |
| 2014/0053057 A1* | 2/2014 | Reshadi | ............. | G06F 16/9574 |
| | | | | 715/234 |
| 2015/0074165 A1* | 3/2015 | Rahardja | ................ | G06F 9/545 |
| | | | | 709/201 |
| 2016/0110470 A1* | 4/2016 | Rajabi | ................ | G06F 16/9566 |
| | | | | 715/234 |
| 2016/0110537 A1* | 4/2016 | Harrison | ................ | G06F 21/53 |
| | | | | 705/14.66 |
| 2017/0185774 A1* | 6/2017 | Sahita | ..................... | G06F 21/53 |
| 2019/0297122 A1* | 9/2019 | Harrison | ................ | G06F 21/53 |

OTHER PUBLICATIONS

Examination Report for EP Appln. Ser. No. 17764697.3 dated Oct. 27, 2020 (6 pages).
International Preliminary Report on Patentability, Ch. I, for PCT Appln. Ser. No. PCT/US2017/047972 dated Mar. 5, 2020 (8 pages).

* cited by examiner

REDUCING REMOTE PROCEDURE CALLS FOR MULTIMEDIA CONTENT DELIVERY

BACKGROUND

Applications executing on a computing device, such as a mobile computing device, can render digital content. The application, or an instance thereof, can request a software development kit ("SDK") configured to render a type of digital content. To improve computer security, the computing environment established for the instance of the application executing on the computing device can be separate or isolated from the computing environment established for another application, or another instance of the same application. For example, the computing environment can include a sandbox security mechanism that separates running programs by, e.g., restricting access to memory, restricting filesystem namespace, rule-based execution, iframes, or virtual machines. Thus, an SDK received to render digital content via the instance of the application may not be available for another application or even another instance of the application executing on the same computing device. Thus, using a sandboxed computing environment to improve computer security can increase remote procedure calls, network utilization, processor utilization, server utilization and latency due to repeated requests for, and downloads of, the SDK to render digital content in separate applications or separate instances of the application.

SUMMARY

The present disclosure is directed to systems and methods of reducing remote procedure calls in multimedia content delivery. For example, the present solution can reduce remote procedure calls, network utilization, processor utilization, server utilization and latency, while maintaining computer security. A markup interpreter can intercept an online document received from a server, and parse the online document to identify a script or other executable logic such as an SDK. The markup interpreter may store a copy of the script in a local cache, separate from sandboxed applications, and may, in some implementations, pre-fetch the script. The markup interpreter may retrieve the script from the cache, and modify the intercepted document to include the, or a reference to the, cached contents, and then forward the newly constructed online document to the application for execution. Accordingly, the application, executing in its sandboxed environment, may not realize that the document has been modified or that it originally contained a reference to the script. Similarly, many applications executing simultaneously on the device, each in its own sandboxed environment, may process modified documents containing the same cached script, despite being normally prohibited from sharing scripts or sandboxed cache space. Accordingly, each application need not transmit separate requests to the server for the script, and thus, the present solution can reduce or eliminate redundant requests for, and downloads of, scripts to execute the online document in separate applications or separate instances of an application.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1A:
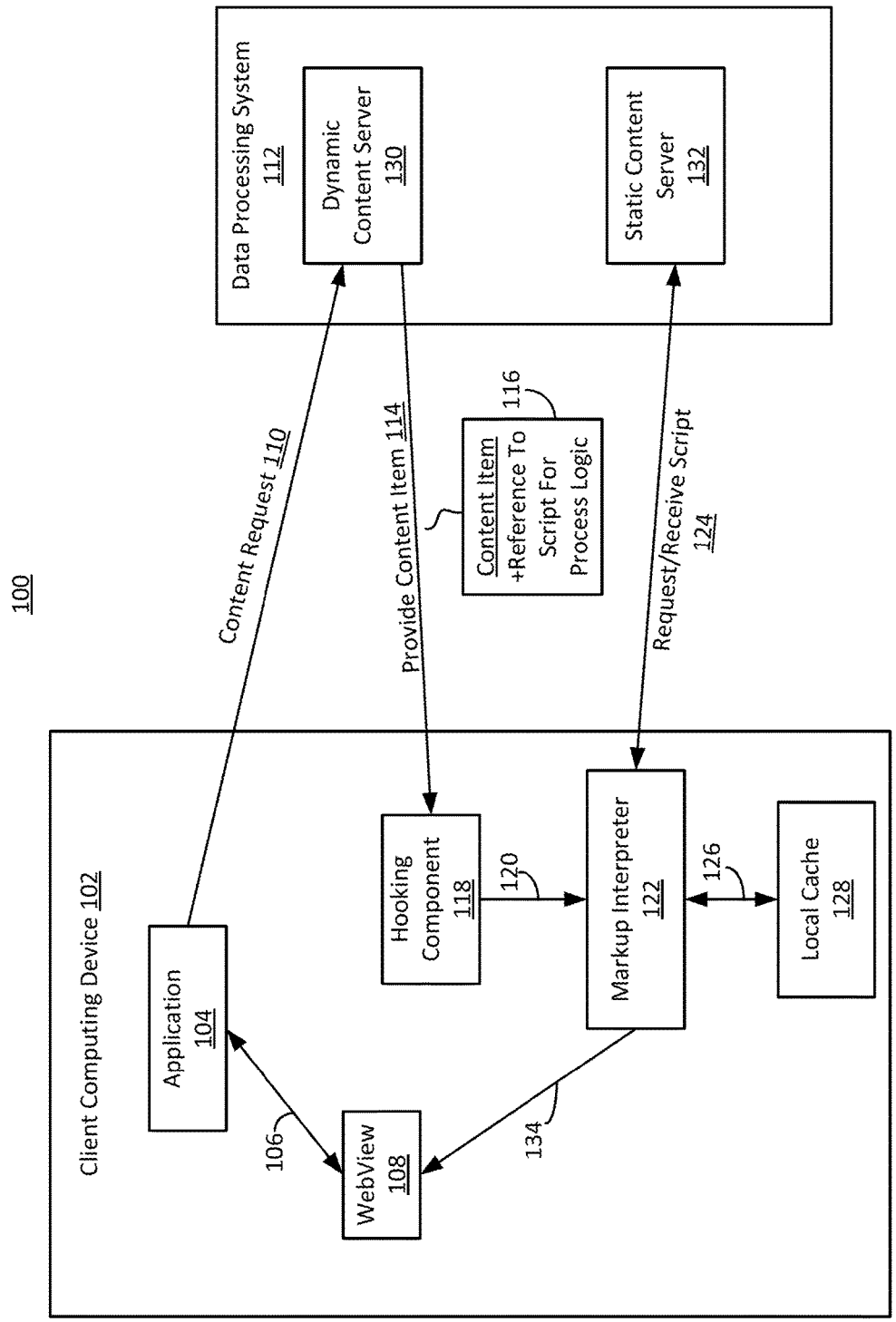
FIG. 1A is an illustration of an operation of a system to reduce remote procedure calls in multimedia content delivery over a computer network, in accordance with an implementation.

Following below are more detailed descriptions of various concepts related to, and implementations of, methods, apparatuses, and systems of balancing data requests between computing devices and content selection infrastructure over a network. The various concepts introduced above and discussed in greater detail below may be implemented in any of numerous ways.

The present disclosure is directed to systems and methods of reducing remote procedure calls in multimedia content delivery. For example, the present solution can reduce remote procedure calls, network utilization, processor utilization, server utilization and latency, while maintaining computer security. A markup interpreter can intercept an online document received from a server, and parse the online document to identify a script or other executable logic such as an SDK. The markup interpreter may store a copy of the script in a local cache, separate from sandboxed applications, and may, in some implementations, pre-fetch the script. The markup interpreter may retrieve the script from the cache, and modify the intercepted document to include the cached contents, and then forward the newly constructed online document to the application for execution. Accordingly, the application, executing in its sandboxed environment, may not realize that the document has been modified or that it originally contained a reference to the cached script. Similarly, many applications executing simultaneously on the device, each in its own sandboxed environment, may process modified documents containing the same cached script, despite being normally prohibited from sharing scripts or sandboxed cache space. Accordingly, each application need not transmit separate requests to the server for the script, and thus, the present solution can reduce or eliminate redundant requests for, and downloads of, scripts to execute the online document in separate applications or separate instances of an application.

For example, applications can execute in a siloed computing environment, sometimes referred to as a sandboxed environment, a restricted data-sharing environment, an application isolation environment, a virtualized environment, or by other similar terms. When executing in a siloed computing environment, the application may have limited or restricted access to computing resources, such as memory, input/output buffers, or network resources. The application executing in a siloed or sandboxed computing environment may be restricted from interacting with one or more other applications, or even one or more instances of the same applications, that may be concurrently executing on the computing device. For example, each siloed instance of an application may have its own memory space, preferences, registry settings, cache, network sockets, etc., and may not have access to—or even necessarily know about—resources of other instances of the application. Due to the restricted or limited access or ability to interact with other applications or memory or files associated with previous instances of the same application, each siloed application or instance of an application may have to request or download scripts or other files or content from a remote server even if the same script or file was previously requested and downloaded on the same computing device. For example, in one such implementation, a web browser may sandbox each browser window or tab from other browser windows or tabs (or a subset of such windows or tabs, such as windows or tabs not launched via links from parent windows or tabs (e.g. independently instantiated)). The processes or execution threads associated with each window or tab may not have access to cached resources of the processes or execution threads associated with other windows or tabs, and accordingly, if a user visits the same website in two windows, the two corresponding browser processes or threads may need to independently transmit requests for the same content, receive and potentially cache the same content, execute embedded scripts, etc. While using a sandboxed computing environment can improve computer security by preventing cross-process or cross-thread vulnerabilities (e.g. one process secretly reading passwords or user data from memory reserved for another process), duplication of content retrieval and storage in the sandboxed computing environments may increase the number of remote procedure calls or server communications, network utilization, processor utilization, server utilization and latency due to repeated requests for and downloads of identical data. Such data may be substantial, such as where retrieved resources include embedded executable resources, such as in-browser media players or SDKs for rendering digital content in separate applications or separate instances of the application.

Thus, latency can be a major issue for mobile sites and applications. High latency can result in poor user experience, wasted computing resources, increased battery usage, increased network utilization, or increased idling. Multimedia content, such as audio or video, may be increasingly impacted by this latency, as video may utilize greater bandwidth than text or image display content items. This may be particularly frustrating for users who may not be aware of the underlying sandboxing of processes and resources and may instead expect duplicate processes, such as duplicate browser windows, to load instantly from a cache. This may be further highlighted in inconsistent cache use: for example, if a user loads a website in a first browser window, and then reloads the website in the same browser window, the process may utilize the previously retrieved cached version to load the website with minimal latency. However, if the user loads the website in a second, separately siloed browser window, the corresponding second process may have no access to or knowledge of the previously retrieved cached version, and may transmit a separate request for the website. Thus, from the perspective of the user, loading times may be inconsistent from application to application, window to window, or even tab to tab.

For example, an SDK that may be redundantly downloaded can include an SDK for executing or rendering banner content items or interstitial content items in mobile applications. An application executing on a client device (e.g., a laptop computer, desktop computer, tablet computer, wearable computer, a mobile device, etc.) can render content that can include images, video, audio, text or other multimedia content. The application can execute within or provide the content via a sandboxed or siloed media content environment, separate from other applications and/or processes or subprocesses of the application. In some embodiments, video digital content rendered in a media player can include media streams with pre-roll, post-roll, or interstitial content. In one such implementation, a media player may be provided via a hypertext markup language ("HTML") 5 or Javascript SDK and execute within a sandboxed computing environment in the application. In some cases, the SDK can be hosted on a server remote from the computing device and retrieved for execution within the sandboxed environment. This SDK can be loaded by the native application on the computing device at or proximate to the time of rendering or playback of the video digital content, rather than being permanently stored on the computing device or cached for a significant duration of time. This may be helpful for implementations in which the SDK is frequently updated, such as with frequent (e.g. daily, weekly, or monthly) code deployments as opposed to much slower releases of a native SDK, which may only update when publishers build a new version of the SDK into the application; and may facilitate cross-platform development. Once the media content has been played by the SDK within the sandboxed environment and the process terminated, that sandboxed environment may be destroyed with resources released (e.g. the media content, as well as the SDK itself). New sandboxed environments may be created to play new media content.

As discussed above, to allow for cross platform development and regular code updates to the media processing logic used to play media content within the media content environments (for example to improve functionality, security, etc.), media processing logic may be stored at a server remote from a user device that is to play the media content. The media processing logic may therefore be fetched from the remote server by a media content environment. While some components of the media processing logic may be stored in a cache belonging to the media content environment, that cache is destroyed with destruction of the media content environment. As such, media processing logic is obtained and loaded into memory each time media content is to be played within a media content environment. This may result in multiple and frequent round trip network calls, increasing latency, network traffic, memory usage and bandwidth requirements.

Although requesting and receiving, from the remote server, the Javascript for loading in the native application SDK can allow for development of key features of the SDKs to happen at a reasonable pace, this approach may increase latency because the Javascript files are loaded each time the content item is rendered or executed, thereby resulting in multiple round trip network calls between the computing device and the remote server. While some files may be cached by the computing environment in which the application executes, this cache is destroyed with the computing environment, and replaced for each instance of the content item or application.

The present disclosure describes implementations of a markup interpreter that can identify and replace references to server-hosted content, including SDKs and other executable logic, in retrieved data with references to locally cached versions of the content, such that sandboxed processes may utilize the locally cached versions without repeatedly loading the same data and without impairing security provided by the sandboxed environment, thereby reducing latency and improving playback of multimedia digital content, such as video. The markup interpreter can improve latency for video or other digital multimedia content shown in native applications. The markup interpreter can, for example, reduce latency of network remote procedure calls ("RPC") for fetching logic files associated with showing a particular content item. The markup interpreter can be configured to cache and refer to cached content in a local or private cache outside the sandboxed environment. For example, a script can be executed to run in a cached or uncached environment. The markup interpreter can identify particular elements within the executed script to cache locally. In some implementations, by identifying only particular elements to cache, the markup interpreter can limit total memory consumption. The markup interpreter can then make the cached elements available for any application executed in separate sandboxed computing environments. Thus, the markup interpreter can automatically identify which elements of the script to pre-cache and replace inline, and which elements of the script to execute on the client computing device without referring to cached results. For example, the markup interpreter can cache specific references to Javascript pages within an HTML page that is processed by an application executing in a local computing environment. In some implementations, the markup interpreter may access a new local cache (e.g., a private cache) and intercept and manipulate the responses from the server before they are sent to the process, thread, or application in the sandboxed computing environment for processing. For example, the markup interpreter can parse or read through an HTML script to identify new markup that describes content (e.g., a Javascript file or another HTML file) to cache outside the sandboxed computing environment cache, and then pull that content from the local cache or fetch and cache the content, and then replace the inline file references with a local file reference to the cached version of the content. As a result, when executing the provided HTML the cached content can be pulled from local disk instead of being pulled with a round trip RPC.

In some cases, the markup interpreter can inline the cached content in the file instead of the reference being replaced with a local file reference. In some cases, the markup interpreter can keep the content to be in-lined in memory instead of or in addition to being written to disk. This can result in reduced latency (e.g., up to whole seconds or longer), although it may utilize more local memory. To avoid using stale cached content, the markup interpreter can assign identifiers to the cached content to allow the application in the computing environment to determine if the version of the currently cached content is compatible with the application and/or if the currently cached content has been superseded. The markup interpreter, therefore, can provide low latency and allow developers to provide frequent updates to SDKs by pushing updates through server changes.

FIG. 1A is an illustration of an operation of a system to reduce remote procedure calls in multimedia content delivery over a computer network, in accordance with an implementation. System 100 can include a client computing device 102. System 100 can include a data processing system 112. The client computing device 102 can interact with data processing system 112 to display a content item. The client computing device 102 can execute an application 104 (e.g., a web browser, mobile application, video game application, news application, map application, etc.). At step 106, the application 104 executing on the client computing device 102 can invoke a WebView 108, such as a sandboxed media computing environment. At step 110, the application can transmit a content request to data processing system 112 (e.g., a dynamic content server 130). The data processing system 112 can include the dynamic content server 130, or access a dynamic content server 130. Dynamic content server 130 can provide content items, such as images, text, video, audio or other digital content. At step 114, the data processing system 112 can provide a content item to the client computing device 102. The content item 116 provided by the dynamic content server 130 can include a reference to a script for process logic. The script can include process logic or provide process logic used to render, execute, or present the content item 114 via WebView 108 invoked by application 104 at step 106.

To reduce remote procedure calls and reduce latency, the client computing device 102 can include a hooking component 118 executing on the client computing device 102 to intercept the content item 114 before the content item 114 is forwarded to the WebView 108 for presentation. The hooking component 114 can intercept the content item and re-direct the content item 114 to a markup interpreter 122 at step 120. The client computing device 102 can include a markup interpreter 122 executing on the client computing device 122 to parse the content item 116 to identify the reference to the script. At step 126, the markup interpreter 122 can query a local cache 128 (e.g., a private cache accessible to the markup interpreter 122) of the client computing device 102 to determine whether the local cache 128 includes the correct version of the script referenced in the content item 114. The markup interpreter 122 can determine, responsive to the query, whether local cache 128 includes the correct version of the script. If the markup interpreter 122 determines that the local cache 128 does not include the correct version of the script, the markup interpreter 122 can, at step 124, request the correct version of the script from a static content server 132 associated with data processing system 112, and the static content server 132 can provide the correct version of the script to the markup interpreter 122. The markup interpreter 122 can then store the correct version of the script in local cache 128.

The markup interpreter 122 can then construct a modified content item that includes the script. For example, the markup interpreter 122 can retrieve the process logic from the local cache 128 and replace the reference to the script in the content item 114 with an inline version of the script (e.g., code or hyper text markup language corresponding to the process logic of the script). The markup interpreter 122 can inline the script in the content item 114 to construct a modified content item or add the script directly to the content item in place of the reference to the script, and forward the modified content item to the WebView 108 at step 108 for rendering or execution by the WebView 108. Thus, by inlining the script in the content item, the markup interpreter 122 can allow the WebView 108 to execute the content item 114 without requiring the WebView 108 or application 104 to separately request the script from the static content server 132 for each new instance of WebView 108.

Figure 1B:
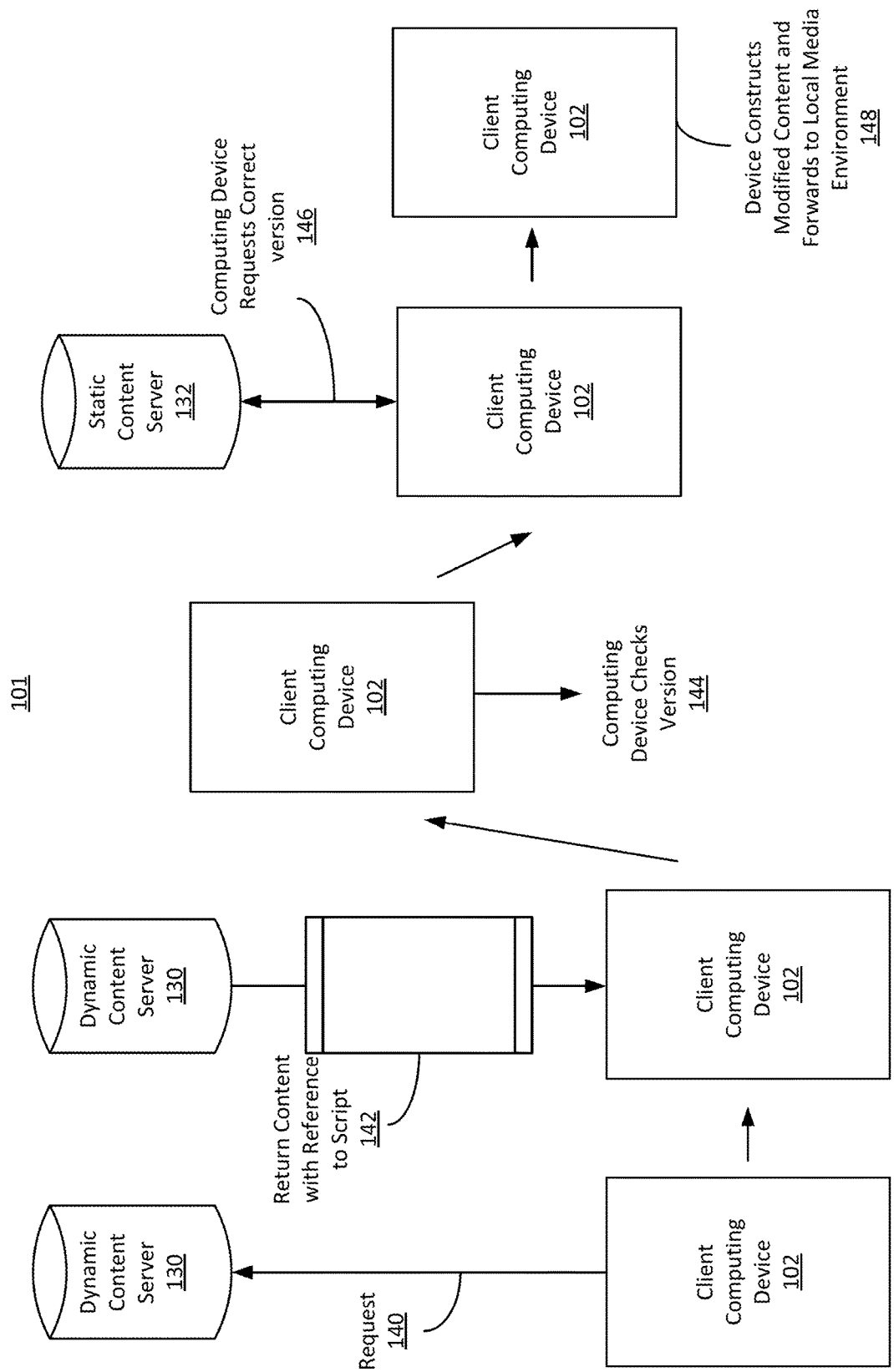
FIG. 1B is an operational block diagram of a system to reduce remote procedure calls in multimedia content delivery over a computer network, in accordance with an implementation.

FIG. 1B is an operational block diagram of a system to reduce remote procedure calls in multimedia content delivery over a computer network, in accordance with an implementation. The operation 101 can be performed by one or more component or functionality of system 100, 200 or system 400, including, for example, data processing system 112 and client computing device 102. As illustrated in FIG. 1B, the client computing device 102 can request a content item from the dynamic content server 130 at step 140. At step 142, the dynamic content server 130 can return a content item with a reference to a script. At step 144, the client computing device 102 can check the version of the script stored in a local cache of the client device 102. At step 146, the client computing device 102 can request a correct version of the script from the static content server 132. At step 148, the client computing device 102 can construct a new, modified content item in-lining the correct script.

Still referring to FIG. 1B, and in further detail, the client computing device 102 can request a content item from the dynamic content server 130 at step 140. An application executing on the client computing device 102 can request content to present via an interface of the client computing device 102. The request can include information to facilitate content selection. The client computing device 102 can transmit the request to a data processing system 112, or dynamic content server 130. The dynamic content server 130 can include or access a content selector (e.g., content selector component 218 of data processing system 112) to select a content item.

At step 142, the dynamic content server 130 can return the selected content item to the client computing device responsive to the request for content. The content item can include a reference to a script. For example, the content item can include HTML with a reference to a Javascript file. In an illustrative example, the HTML of the content item can include:

<script type="text/Javascript" src=https://examplesdk.exampleapps.com/somecode.js" cache-version-id="6.21.074" "core-cache-policy="replace-inline">

At step 144, the client computing device 102 can check the version of the script stored in a local cache (or private cache) of the client device 102. For example, the client computing device 102 (e.g., via a markup interpreter) can intercept the returned content item to identify the script. The markup interpreter can parse the HTML of the content item to identifier the script "somecode.js". The markup interpreter can identify the source of the script by identifying the tag or indicator "src=" as somecode.js as https://examplesdk.exampleapps.com/. The markup interpreter can further identify a version of somecode.js based on the tag or indicator "cache-version-id=" as "6.21.074". The markup interpreter can further determine how the script is to be embedded or executed with the digital content based on the indicator or tag "core-cache-policy=" as "replace-inline".

Upon identifying the name of the script and the desired version of the script as prescribed in the content item returned from the dynamic content server 130, the client computing device 102 can check a local cache in memory of the client computing device to determine if the script is stored in the memory. The client computing device 102 can query the local cache in memory for "somecode.js" and version "6.21.074". In some cases, the client computing device 102 can determine that the correct version of the script is stored in memory, and can proceed with in-lining the script in the HTML of the content item. However, in some cases the markup interpreter can determine that the correct version of the script is not available in the memory of the client computing device. For example, responsive to the query, the markup interpreter may receive indication of versions "6.21.072" and "6.21.073" of somecode.js. The markup interpreter that these stored versions do not match the desired version 6.21.074.

At step 146, the client computing device 102 can request a correct version of the script from the static content server 132 responsive to determining the correct version is not stored in local cache, and then store the correct version in the local cache. The client computing device 102 (e.g., via the markup interpreter) can request the correct version of the script from a static content server 132 of the data processing system 112. The request can include the identifier of the script and the version identifier of the script as identified by the markup interpreter at step 142. The client computing device 102 can receive, in response to the request, the correct version of the script from the static content server 132. The client computing device 102 can store the correct version of the script in memory of the client computing device 102 for future use. The client computing device 102 can assign or associate the correct version of the script with the identifier of the script and the version identifier of the script such that the markup interpreter can locate the correct version of the script in response to subsequent requests for the script.

At step 148, the client computing device 102 can construct a new, modified content item in-lining the correct script. The markup interpreter can construct a modified content item that includes the HTML corresponding to the script stored in the local cache (e.g., contents of somecode.js). The markup interpreter can forward this newly modified digital content to a webview associated with an application executing on the client computing device 102 for execution.

Figure 2:
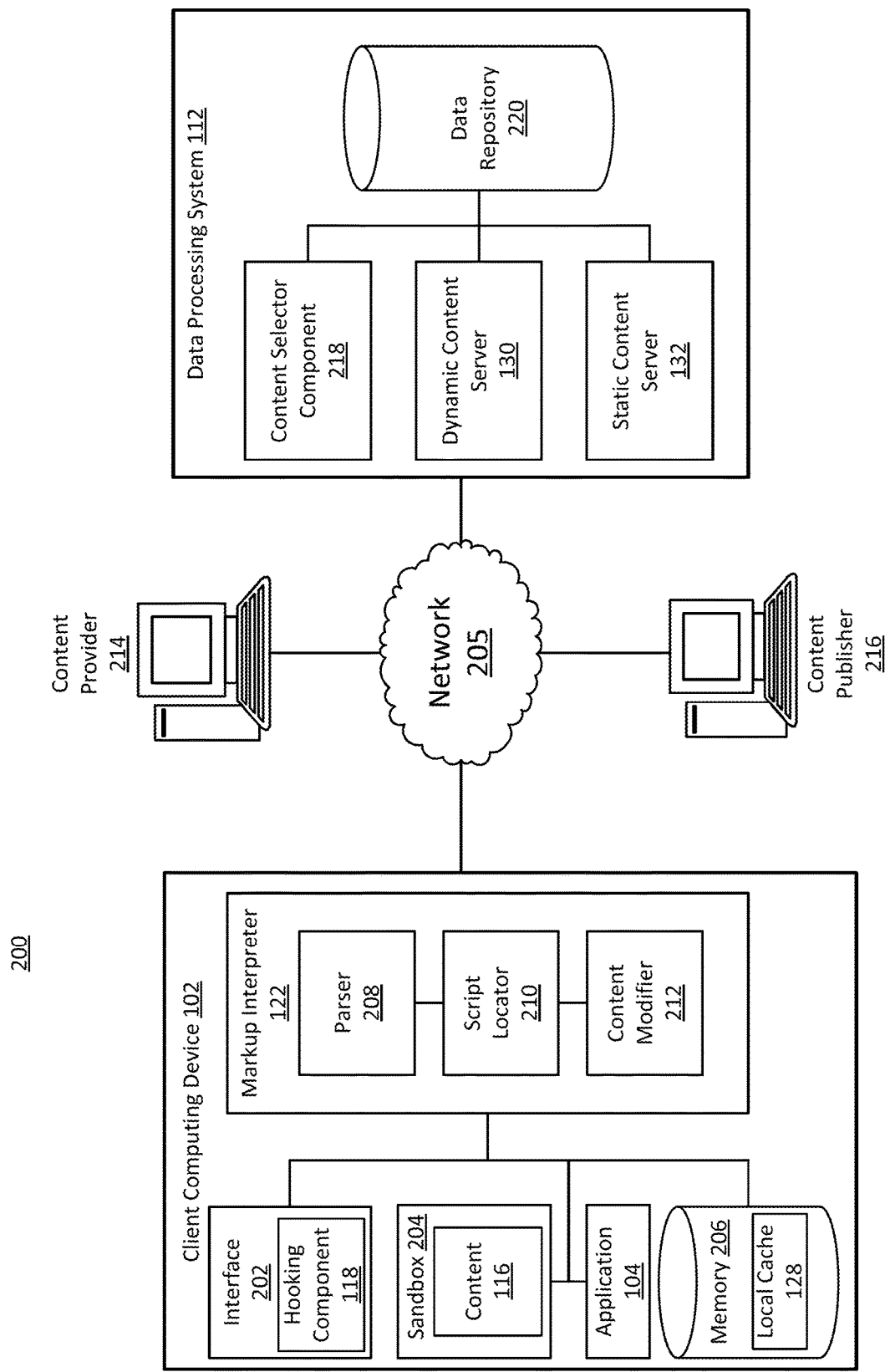
FIG. 2 is an illustration of a system to reduce remote procedure calls in multimedia content delivery over a computer network, in accordance with an implementation.

In some implementations, the markup interpreter 122 can refresh the local cache 128 in memory 206, as depicted in FIG. 2. For example, markup interpreter 122 can be configured with a cache policy, such as a cache replacement technique, time-to-live ("TTL") cache policy, etc. For example, a script stored in the cache in memory 206 can be assigned a TTL value, such as 6 hours, 12 hours, 24 hours, 48 hours, 1 week, 30 days, etc.

FIG. 2 illustrates an example system 200 to reduce remote procedure calls for multimedia content delivery between a client computing device and a data processing system. The system 200 can include content selection infrastructure. The system 200 can include a data processing system 112 communicating with one or more of a content provider computing device 214, content publisher computing device 216 or client computing device 102 via a network 205. The network 205 can include computer networks such as the Internet, local, wide, metro, or other area networks, intranets, satellite networks, and other communication networks such as voice or data mobile telephone networks. The network 205 can be used to access information resources such as web pages, web sites, domain names, or uniform resource locators that can be displayed on at least one computing device 102, such as a laptop, desktop, tablet, personal digital assistant, smart phone, portable computers, or mobile telecommunication device. For example, via the network 205 a user of the computing device 102 can access web pages provided by at least one web site operator or content publisher 216. A web browser (e.g., application 104) of the client computing device 102 can access a web server of the web site operator or content publisher 216 to retrieve a web page for display on a monitor of the computing device 102. The content publisher 216 can provide instructions to the application 104 executing on the computing device 102 to render the content. The web site operator or content publisher 216 generally includes an entity that operates the web page. The web site operator or content publisher 216 includes at least one web page server that communicates with the network 205 to make the web page available to the computing device 102. The data processing system 112 can provide instructions to the application 104 executing on the computing device 102 to render content.

The network 205 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 205 may include a wireless link, such as an infrared channel or satellite band. The topology of the network 205 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 200 can include at least one data processing system 112. The data processing system 112 can include at least one logic device such as a computing device having a processor to communicate via the network 205, for example with the computing device 102, the web site operator or content publisher computing device 216 (or content publisher 216), and at least one content provider computing device 214 (or provider device 214 or content provider 214). The data processing system 112 can include at least one computation resource, server, processor or memory. For example, the data processing system 112 can include a plurality of computation resources or servers located in at least one data center. The data processing system 112 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 112 can include a content placement system having at least one computation resource or server. The data processing system 112 can include or communicate with at least one dynamic content server 130. The data processing system 112 can include or communicate with at least one static content server 132. The content provider device 214 can provide dynamic content, such as video content items, to the data processing system 112, and the data processing system 112 can provide the video content items to the client computing device 102. In some cases, the content publisher 216 can provide static content, such as an online document or web page, to the client computing device 102, and the data processing system 112 can provide a video interstitial content item for presentation via application 104 on the client computing device 102.

The data processing system 112 can include, access, interact with, or otherwise communicate with at least one content selector component 218, at least one dynamic content server 130, at least one static content server 132, and at least one data repository 220. The at least one data repository 220 can include or store, in one or more data structures or databases, content data, scripts, digital content, data files, applications, or a markup interpreter. Content data can include, for example, content campaign information, content groups, content selection criteria, content item objects or other information provided by a content provider 214 or obtained or determined by the data processing system 112 to facilitate content selection.

The content selector component 218, dynamic content server 130, or static content server 132 can each include at least one processing unit or other logic device such as programmable logic array engine, or module configured to communicate with the database repository or database 220. The content selector component 218, dynamic content server 130, static content server 132, and data repository 220 can be separate components, a single component, or part of the data processing system 112. The system 200 and its components, such as a data processing system 112, may include hardware elements, such as one or more processors, logic devices, or circuits.

The data processing system 112 can obtain anonymous computer network activity information associated with a plurality of computing devices 102. A user of a computing device 102 can affirmatively authorize the data processing system 112 to obtain network activity information corresponding to the user's computing device 102. For example, the data processing system 112 can prompt the user of the computing device 102 for consent to obtain one or more types of network activity information. The identity of the user of the computing device 102 can remain anonymous and the computing device 102 may be associated with a unique identifier (e.g., a unique identifier for the user or the computing device provided by the data processing system or a user of the computing device). The data processing system can associate each observation with a corresponding unique identifier.

The data processing system 112 can include, execute, or communicate with a graphical user interface with one or more input text boxes, buttons, drop down menus, widgets or other user interface elements. The data processing system 112 can provide the graphical user interface for rendering on a content provider device 214. The data processing system 112 can receive, via the graphical user interface, parameters or other information that facilitates a content selection process or establishing a content selection process.

The graphical user interface provided by the data processing system 112 can include a dynamic interface. The dynamic interface can provide information responsive to input received from the content provider device 214. The graphical user interface of the data processing system 112 can forward or route data packets received from the content provider device 214 to one or more component of the data processing system 112, such as the content selector component 218 or data repository 220. The data processing system 112 can include a network interface, user interface, input/output interface, communications port, a bus, or other software or hardware to provide data packets or information to a content provider device 214, content publisher device 216 or computing device 102, and receive data packets or information from the content provider device 214, content publisher device 216 or computing device 102.

The content provider 214 can provide one or more content item objects for selection by the data processing system 112. The data processing system 112 can select the content item objects when a content placement opportunity becomes available that matches the budget, content schedule, maximum bids, keywords, and other selection criteria specified for the content group. Different types of content item objects can be included in a content group, such as a text content item, an image content item, video content item, audio content item, multimedia content item, call content item, content item link, interstitial content item, or a banner content item.

The data processing system 112 can include, execute, or otherwise communicate with a content selector component 218 to receive and select, based on the keyword, a content item via a real-time content selection process. The content selection process can refer to, or include, selecting sponsored content item objects provided by third party content providers 214. The real-time content selection process can include a service in which content items provided by multiple content providers are parsed, processed, weighted, or matched in order to select one or more content items to provide to the computing device 102. The content selector component 218 can perform the content selection process in real-time. Performing the content selection process in real-time can refer to performing the content selection process responsive to the request for content received via the client computing device 102. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 102, or within a time interval after the communication session is terminated.

For example, the data processing system 112 can include a content selector component 218 designed, constructed, configured or operational to select content item objects. To select content items for display, the data processing system 112 can use keywords to select a matching content item based on a matching technique. The candidate content items may include metadata indicative of the subject matter of the candidate content items, in which case the content selector component 218 may process the metadata to determine whether the subject matter of the candidate content item corresponds to the input keywords.

For example, the data processing system 112 can receive, from computing device 102, one or more data packets comprising a request for content to be rendered in a content slot. The content slot can be presented by electronic display hardware via the application 104 executed by the computing device 102. The application 104 can include, e.g., a web browser, mobile application, or video game. Responsive to receiving the request, the data processing system 112 (e.g., via content selector component 218) can execute a real-time content selection process to identify a plurality of content items based on the one or more data packets. The content selector component 218 can identify the plurality of content items based on matching one or more criteria carried or indicated by the one or more data packets with one or more content selection criteria provided by the content provider 214. The criteria indicated by the one or more data packets can include information about the content slot on which the content item is to be rendered, information associated with application 104, information about the web page, or information associated with the computing device 102.

The client computing device 102 can include access, interact with, or otherwise communicate with at least one interface 202, at least one sandbox computing environment 204, at least one application 104, at least one markup interpreter 122, at least one script locator 210, at least one parser 165, at least one digital content modifier 212, and at least one memory 206. The at least one memory 206 can include or store, in one or more data structures or databases, content data, scripts, digital content, data files, applications, or a markup interpreter. The at least one memory 206 can include a local cache 128 that is accessible to markup interpreter 122. For example, markup interpreter 122 can store scripts for process logic in local cache 128, and the local cache 128 can maintain or keep the stored scripts for multiple sessions or instances of application 104 or sandbox 204.

The interface 202, sandbox 204, and markup interpreter 122 can each include at least one processing unit or other logic device such as programmable logic array engine, or module configured to communicate with the memory 206. The interface 202, sandbox 204, markup interpreter 122 and memory 206 can be separate components, a single component, or part of the client computing device 102. The client computing device 102 and its components can include hardware elements, such as one or more processors, logic devices, or circuits.

The client computing device 102 can execute an application 104 in a sandbox 204 of the client computing device 102. In some cases, the client computing device 102 can execute a first portion of the application 104 in the sandbox 204, and a second portion of the application 104 in a non-sandboxed computing environment in memory 206. In some cases, the client computing device 102 can execute at least a portion of the application 104 in the sandbox 204. In some cases, the application 104 can launch or invoke a sandbox 204 to execute, render or present a content item via the application 104. For example, the application 104 can invoke and establish the sandbox 204 to render or execute a video content item, and then terminate, erase, or remove the sandbox 204 upon completion of the video content item. The application 104 may continue to execute, while the sandbox 204 may be erased or terminated. Thus, the application 104 may invoke a second sandbox 204 to render a second video content item.

A sandbox 204 can include or be referred to as sandboxed media environment, a siloed environment, a virtualized environment, an isolated environment, an application isolation environment, or by any other similar terms. A sandboxed environment can be a security mechanism that separates multiple running processes, threads, or applications 104, or multiple running instances of the same process, thread, or application 104. Sandbox 204 can be used to execute programs or code, possibly from unverified or untrusted third parties, suppliers, users or websites, without risking harm to the client computing device 102 or operating system by preventing processes executing malicious code from having access to operating system parameters or controls, user data, or even data of other sandboxed processes. Sandbox 204 can provide a tightly controlled set of resources in which applications 104 run, such as scratch space on disk and memory (e.g., memory 206). The sandbox 204 can restrict or block certain network access, the ability to inspect the client computing device 102, or read/write from/to certain input devices.

In some cases, the sandbox 204 can provide a type of virtualization. In some cases in which the sandbox is provided by a web browser (e.g. for processes associated with windows or tabs), the sandbox 204 can include a type of iframe or provide functionality associated with an iframe. In some cases, the sandbox 204 can include or provide functionality associated with a webview. The sandbox 204 can include or provide a webview rendering engine the application 104 can leverage to render or execute digital content, such as content item 116.

For example, the sandbox 204 can include or execute a webview or window. The webview can allow the application 104 to embed external web content, such as a content item 116, in the application 104. The content item 116 can run in the sandbox 204 which can be a separate process from the application 104. Thus, an exploit inside of the sandbox 204 may be isolated from the application 104 and may not be able to gain elevated privileges the application 104 may have. Further, the storage of data, such as cookies, by the sandbox 204 can be isolated from the application 104 so the webview cannot access data associated with application 104.

Sandboxed 204 digital content 116 can be embedded within the application 104. For example, sandboxed 204 digital content 116 can be embedded within the application 104 using an iframe. An iframe can refer to an HTML document embedded within another HTML document on a website executed via application 104 (e.g., a web browser). The iframe HTML element can be configured to insert digital content from another source, such as content provider 214 or data processing system 112. The iframe can execute JavaScript Ajax (Asynchronous JavaScript and XML, a metalanguage that allows develops to define customized markup languages).

The client computing device 102 can include one or more interfaces 130, which may be of the same or different types. The interface 202 can include a network interface, user interface, input/output interface, communications port, a bus, or other software or hardware to receive information or instructions input via one or more input/output devices communicatively coupled to the client computing device 102, receive data packets via network 205, or transmit data via network 205. The interface 202 can include a graphical user interface, multi-touch interface, gesture-based interface, audio or voice based interface. The interface 202 can include or interact with sensors, such as a location sensor (e.g., global positioning system, wireless transmissions, short-range wireless interconnection, near field communication, etc.), accelerometer, gyroscope, ambient light sensor, motion detector, ambient sound sensor, ambient temperature sensor, etc. The interface 202 can allow one or more components of the client computing device 102 to interact with one another. For example, the interface 202 can relay data or instructions between one or more of the application 104, sandbox computing environment 204, memory 206, and markup interpreter 122.

The interface 202 can provide data packets or information to a content provider device 214, content publisher device 216 or data processing system 112, and receive data packets or information from the content provider device 214, content publisher device 216 or data processing system 112.

The interface 202 can include, execute, or communicate with a graphical user interface with one or more input text boxes, buttons, drop down menus, widgets or other user interface elements. The data processing system 112 can provide the graphical user interface for rendering on the client computing device 102. The data processing system 112 can receive, via the interface 202 of the computing device 102, parameters or other information that facilitates a content selection process. The interface 202 of the client computing device 102 can forward or route data packets received from one or more component of the client computing device 102 to the data processing system 112, the content provider device 214, or content publisher 216.

For example, the interface 202 can transmit a request for digital content for presentation via application 104 executing on the client device in the sandboxed media environment 204. The request can include information to facilitate content selection by the data processing system 112 (e.g., by content selector component 218). The application 104 running on the computing device 102 can generate the request and instruct interface 202 to transmit the request to data processing system 112. The application 104 can generate the request responsive to an indication, interaction or trigger event. For example, the application 104 can generate the request responsive to a user of the computing device 102 accessing a resource via application 104. The request can include or be associated with information that facilitate selecting digital content, such as content selection criteria, preferences, size, width, position, type of digital content (e.g., static, dynamic, images, text, video, audio), or type of presentation (e.g., banner or interstitial).

The interface 202 can transmit the request to data processing system 112 via network 205. The interface 202 can transmit the request to a dynamic content server 130 of the data processing system 112. For example, the data processing system 112 can receive the request, process the request via the content selector component 218 to select a content item, and then instruct the dynamic content server 130 to provide the corresponding selected dynamic content, and instruct the static content server 132 to provide any corresponding selected static content, such as digital content processing logic, media processing logic, scripts, Javascripts, AJAX, etc. For example, the dynamic content server 130 can provide content items, such as images, audio, video, or other multimedia content, and the static content server 132 can provide scripts such as Javascripts used to execute the content item for presentation via an interface 202 of the client computing device 102.

The interface 202 can receive, responsive to the request, a content item comprising a reference to a script. The interface 202 can receive the content item (e.g., digital content 116) from the data processing system 112 (or dynamic content server 130 thereof). The interface 202 can forward or provide the received content item to one or more component of client computing device 102. In some cases, the interface 202 can provide the content item to the component that requested the content item. For example, the interface 202 can forward the content item to application 104, or webview executing in sandbox 204.

The client computing device 102 can include a markup interpreter 122 designed and constructed to intercept the content item. Markup interpreter 122 may comprise an application, service, server, daemon, routine, or other executable logic for intercepting documents or data requested by and transmitted to a sandboxed application, thread, or process; and for replacing one or more portions of the intercepted documents or data. The markup interpreter 122 can run in an application layer outside of the scope of the sandbox 204, media content environment or webview. The markup interpreter 122 can run in the same layer that invokes and creates the sandbox 204 (or webview or media content environment). The markup interpreter 122 can intercept the content item prior to the application 104 (or sandbox 204) receiving the content item. The markup interpreter 122 can intercept the content item prior to receipt by the application 104 (or portion of the application 104) executing in the sandboxed media environment (e.g., sandbox 204).

For example, the markup interpreter can intercept the content item using a hooking component or hooking techniques designed to intercept function calls, content items, messages or events passed between components of the client computing device, such as from interface 202 to application 104 or sandbox 204. The markup interpreter 122 can insert an event hook at runtime of the application 104 that is configured to intercept the content item. In some implementations, markup interpreter 122 may execute within a network stack, e.g. prior to delivery of data to an application layer of the stack. In other implementations, a markup interpreter 122 may execute within a kernel level of an operating system, a user level, or may be executed by a hypervisor independently of one or more virtual machines.

The markup interpreter 122 can include a parser 208 designed and constructed to parse the content item to extract an identifier of a script referenced in the content item 116. The parser 208 can identify references to a script such as a Javascript file, data file, HTML file, application programming interface, link, etc. The parser 208 can be configured with a pattern matching technique or search pattern to identify the identifier of the script or reference to the scrip in the content item. The parser 208 can be configured with patterns using regular expressions (e.g., regex, regexp or rational expression), which can be a sequence of characters that define a search pattern. The parser 208 can use the regular expression with a string searching technique to identify the script in the content item 116.

For example, parser 208 can use regular expressions (and consequently, regexes) to mean a standard textual syntax for representing patterns to which matching text is to conform. Each character in a regular expression (e.g., each character in the string describing its pattern) can be a metacharacter (with its special meaning), or a regular character (with its literal meaning). For example, in the regex 'a.', 'a' is a literal character which matches just 'a' and '.' is a meta character which matches every character except a newline. Therefore, this regex would match, for example, 'a' or 'ax' or 'a0'. Together, the parser 208 can use metacharacters and literal characters to identify textual material of a given pattern, or process a number of instances of it. Pattern-matches can vary from a precise equality to a very general similarity (controlled by the metacharacters).

The parser 208 can translate a regular expression into an internal representation which the parser 208 can execute and match against a string representing the text being searched. For example, the parser 208 can construct a nondeterministic finite automaton (NFA), which is then made deterministic and the resulting deterministic finite automaton (DFA) is run on the target text string (e.g., of the digital content 116) to recognize substrings that match the regular expression. The identifier of the script can include alphanumeric characters, strings, or symbols, for example.

The parser 208 can extract an identifier of the script based on tags in the content item. Tags can include, for example, <script type>, <script>, or <href. Using tags or regular expressions, the parser 208 can identify the name of a script and version of the script. For example, the content item can include: <script type="text/Javascript" src=https://examplesdk.exampleapps.com/somecode.js">. The parser 208 can parse the content item to identify this script. The parser 208 can extract an identifier for the script based on the script type, name of the script, source of the script or the version of the script. In this example, the type of script can be a text Javascript and the source of the script can be https://examplesdk.exampleapps.com/somecode.js.

In some cases, the content item can also indicate the version of the script. For example, the content item can include: <script type="text/Javascript" src=https://examplesdk.exampleapps.com/somecode.js" cache-version-id="6.21.074">. In this example, the version identifier is 6.21.074. Other identifiers may be used, including alphanumeric identifiers, version names (e.g. alpha, beta, delta, etc., or Al, Bob, Charlie, etc.), or any other type and form of identifiers.

Upon identifying the identifier of the script, the parser 208 can forward the identifier to a script locator 210. The markup interpreter 122 can include a script locator 210 designed and constructed to identify, based on the identifier of the script, the script stored in memory 206 (e.g., a local cache or private cache accessible by the markup interpreter 122) on the client computing device 102 that is separate from the sandbox 204 (e.g., sandboxed media environment). The script locator 210 can perform a lookup in the memory 206 to determine whether the script is stored in the memory. The script locator 210 can perform the lookup using the identifier identified via the parser 208. In some cases, the script locator 210 can perform the lookup using one or both of the identifier and the version number of the script. The memory 206 can store one or more scripts in a data structure or database.

In some cases, the script locator 210 can query the memory 206 or other data repository or database of client computing device 102 for the script corresponding to the identifier identified by the parser 208. The script locator 210 can receive, in response to the query, an indication as to whether the script corresponding to the identifier is available in a local cache, memory or other database of the client computing device 102. The script locator 210 can determine that the script is available in the memory 206; the script is not available in the memory 206; the type of script and the version referred to in the content item is available in the memory; or the type of script is available in the memory 206 but not the same version referred to in the content item.

For example, markup interpreter 122 can parse the content item to identify a version of the script, and then determine that the version of the script indicated in the content item matches the version of the script stored in the local cache. However, in some cases, the markup interpreter 122 can determine that the identified script or version is not available in memory 206. Responsive to determining that the identified script is not available in memory 206, the markup interpreter can request the script from data processing system 112 (e.g., dynamic content server 130). The markup interpreter 122, via script locator 210 and interface 202, can generate a request for the identified version of the script, and transmit the request to data processing system 112. The data processing system 112 can provide the script responsive to the request from the markup interpreter 122. The markup interpreter 122 can receive the script from the data processing system 112, and store the script in memory 206 in association with the identifier of the script.

The markup interpreter 122 can determine to store the script of the content item in the local cache in memory 206 based on a predetermined list of types of scripts enabled for storage in the local cache of the client device. For example, the markup interpreter 122 can be configured with a predetermined list of types of scripts to store in memory 206 that can facilitate reducing remote procedure calls in multimedia content delivery. The markup interpreter 122 can compare the identifier of the script identified by the parser 208 with identifiers for scripts stored in a data structure comprising a predetermined list of types of scripts to identify a match. Responsive to identifying a match, the markup interpreter 122 can determine to store the scrip in memory 206 for future use in order to reduce remote procedure calls. If, however, the markup interpreter 122 determines that the identifier of the script identified by the parser 208 does not match an identifier of the predetermined list of types of scripts, then the markup interpreter 122 can determine to not store the script in memory 206 for use by other sessions or instances of the application. Thus, by only locally caching scripts that are marked for local caching, the markup interpreter 122 can reduce memory consumption by not caching scripts that should not be locally cached. In other implementations, markup interpreter 122 may cache scripts or other data that is not marked as cacheable, or is explicitly marked as non-cacheable. This may reduce network latency, at the potential expense of freshness of content. In a similar implementation, markup interpreter 122 may change cacheability markings for content. For example, markup interpreter 122 may cache content or scripts marked as cacheable, and, when delivering the scripts or content to sandboxed processes, may modify the content or scripts to mark them as non-cacheable. This may reduce memory usage by preventing sandboxed processes from separately caching the content or scripts in a local cache of the sandbox, while still reducing latency by locally caching the content or scripts and thus not requiring separate retrieval of the content from a remote server for each sandboxed process. In other implementations, cacheability modifications may be made by a content modifier 170, discussed in more detail below.

The markup interpreter 122 can include a content modifier 170 designed and constructed to modify a content item based on the script stored in the local cache of memory 206. Content modifier 170 may comprise an application, service, server, daemon, routine, or other executable logic for modifying content items to refer to a local address rather than a remote address, modifying cacheability markings or indicators, other otherwise modifying content for use by sandboxed processes or applications. The digital content modifier 212 can construct a modified content item based on the script stored in memory 206 and the content item received from data processing system 112. The markup interpreter 122 can then forward the modified content item to the application 104 (or portion thereof) executing on the client computing device 102 in the sandboxed media environment (e.g., sandbox 204) to cause the application 104 (or sandbox 204) to execute the modified content item.

The digital content modifier 212 can modify the content item 116 with an inline script. For example, the digital content modifier 212 can inline Javascript. By modifying the content item 116 with inline Javascript, the markup interpreter 122 can reduce the number of remote procedure call requests made because the contents of the Javascript resources can be included or embedded directly into the content item (e.g., an HTML document). This can reduce the time it takes to display or provide the content item to the user of client computing device 102.

By writing the contents of script resources directly into the content item, the application 104 may not have to request those resources from the data processing system 112. For example, the content item can include HTML code as follows:

```
<HTML>
    <head>
        <script type="text/Javascript" src="example.js"></script>
    </head>
    <body>
        <div>
            Hello, world!
        </div>
    </body>
</HTML>
```

In this example, the resource example.js can be:
/* contents of an example JavaScript file */Then the digital content modifier 212 of the markup interpreter 122 executing on the client computing device 102 can rewrite the HTML of the content item to construct a modified content item as follows:

```
<HTML>
    <head>
        <script type=>"text/Javascript" src="example.js"></script>
            /* contents of an example JavaScript file */
        </script>
    </head>
    <body>
        <div class="blue yellow big bold">
            Hello, world!
        </div>
    </body>
</HTML>
```

By creating the modified content item with the inline script retrieved from local cache in memory 206, the markup interpreter 122 can eliminate one or more external requests for example.js, thus reducing remote procedure calls in multimedia content delivery over network 205.

Upon constructing the modified content item, the markup interpreter 122 can forward the modified content item to the application 104 to cause the application 104 to execute the content item in the sandbox 204. Thus, even though the application 104 or portion thereof executing in sandbox 204 may not have access to locally cached scripts stored in memory 206, the markup interpreter 122, by intercepting and modifying the content item received from data processing system 102, can provide a modified content item for execution by sandboxed application 104.

Due to the security mechanism provided by sandbox 204, separate instances of the application 104, or even separate instances of webviews provided via application 104, may not have access to the same data because the memory 204 associated with the sandbox 204 can be erased subsequent to the session terminating. For example, the client computing device 102 can establish a first session in which a first instance of the application 104 can request a content item and execute the content item in a first instance of the sandbox 204. The first session can refer to a first instance of the application (or portion thereof) executing in the sandbox 204 invoked for the first instance of the application 104. The first session can begin, start or initiate responsive to invocation of the sandbox 204. The first session can end, terminate or exit responsive to the first instance of the application (or portion thereof) executing in the sandbox 204 closing, which can cause the client computing device 102 to clear or erase the memory or other data associated with the first instance of the application executing in the sandbox 204.

The client computing device 102 can establish a second session for a second instance of the application (or portion thereof) executing in the sandbox 204. In some cases, the first session can refer to a first instance of the sandbox 204. For example, the same application 104 can invoke one or more sessions for one or more instances of the sandbox 204 to execute one or more content items. The application 104 can establish a first session to invoke a first instance of the sandbox 204 to execute a first content item; and establish a second session to invoke a second instance of the sandbox 204 to execute a second content item. The first and second content items can be the same or different content items.

The client computing device 102 can establish a first session for the application executing on the client device in the sandboxed media environment prior to the requesting the content item from the dynamic content server. For example, the client computing device 102 can establish first session to invoke a first instance of the sandbox 204 in which to execute the application 104 or portion thereof (e.g., a webview portion of the application 104). The client computing device 102 can terminate the first session subsequent to the application 104 executing the modified content item (e.g., in the sandbox 204 or a webview). Terminating the first session can include clearing a cache corresponding to the sandboxed media environment. For example, the sandbox 204 can lock a portion of cache in memory 206 for use by the sandbox 204, and then clear the locked portion of the cache in memory 206 responsive to termination of the first instance of the sandbox 204.

The markup interpreter 122 can reduce remote procedure calls in second and subsequent sessions that utilize the same version of the script stored in memory 206. For example, in a first session, the markup interpreter 122 can identify the identifier for the script in the content item, determine that the script is not stored in memory 206, and request and receive the script from data processing system 112. In subsequent sessions in which the same script is used to execute a subsequent content item, the markup interpreter 122 can intercept the content item received from data processing system 112 and replace the identifier in the second content item with inline Javascript that was previously stored in memory 206 during a first or previous session. In some cases, the second or subsequent session can be established subsequent to termination of a first or previous session. In some cases, the second or subsequent session can overlap with the first or previous session, but run in a separate process from the first or previous session.

The client computing device 102 can establish a second session for the application 104 executing on the client device in the sandboxed 204 (e.g., sandboxed media environment). The second session can correspond to a second or subsequent instance of the application 104. The first or previous instance of the application 104 may have terminated, or be running in a separate process. The first or previous instance of application 104 may overlap at least partially with the second or subsequent instance of the application 104. The second instance of the application 104 executing in the second session can request content from the data processing system 112, and receive a second content item from data processing system 112.

The second content item can include a second reference to a second script. The parser 208 can parse the second content item to identify a second identifier corresponding to the second reference of the second script. The script locator 210 can perform a lookup in memory 206 with the second identifier to determine that the local cache in memory 206, which is separate from the sandboxed 204, does not have the second script. The markup interpreter 122 can, responsive to the determination that the local cache does not have the second script, request the second script from data processing system 112 (e.g., a static content server 132). The markup interpreter 122 can store the second script in the local cache of memory 206.

Using the second script stored in memory 206, the markup interpreter 122 can construct, based on the second script received from the static content server 132 and stored in the local cache, and the second content item received from the dynamic content server 130, a second modified content item. The markup interpreter 122 can forward the second modified content item to the application executing on the client device in the sandboxed media environment to cause the application to execute the second modified content item.

The second script can be a different type of script than the first script, a different script, or a different version of the first script (e.g., an updated version). The markup interpreter 122 can construct multiple, different modified content items using the same script stored in memory 206, and provide the multiple, different modified content items to separate instances of the application 104 that execute in different sandboxes 204.

Figure 3:
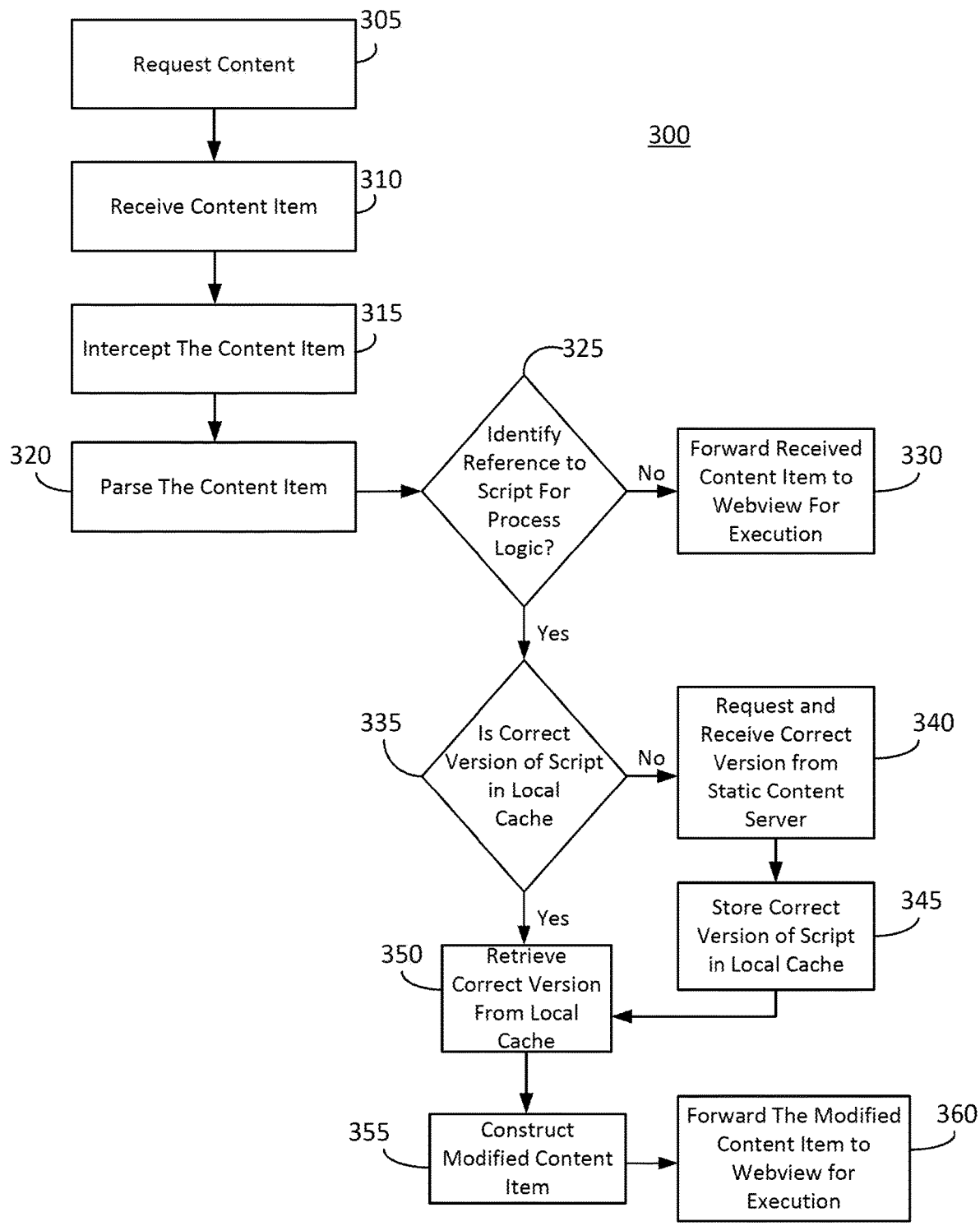
FIG. 3 is an illustration of a flowchart of a method of reducing remote procedure calls in multimedia content delivery over a computer network, in accordance with an implementation.

FIG. 3 is a flowchart of an implementation of a method of reducing remote procedure calls in multimedia content delivery over a computer network. The method 300 can include a computer-implemented method of reducing remote procedure calls in multimedia content delivery over a computer network comprising at least one processor in communication with at least one memory. The method 300 can be performed via one or more system or component illustrated in FIG. 1A, FIG. 1B, FIG. 2, or FIG. 4, including, e.g., a client computing device, an interface, a markup interpreter, memory, or a data processing system. In brief overview, the method 300 can include a client computing device requesting content at step 305. At step 310, the client computing device can receive the content item. At step 315, a markup interpreter of the client computing device can intercept the content item. At step 320, the markup interpreter of the client computing device can parse the content item. At step 325, the markup interpreter determines whether a reference to a script for process logic was identified. If no reference to a script for process logic was identified, the markup interpreter can proceed to step 330, which can include forwarding the received content item to a webview for execution, rendering, or other processing. If, however, a reference to a script for process logic was identified, the markup interpreter can proceed to step 335, which can include, in some implementations, determining if the correct version, or any version in some implementations, of the script is stored in a local cache of the client computing device. The interpreter may determine if the correct version is stored in the cache or if the script is stored in the cache via comparison of creation or modification dates, expiration dates, version identifiers, or any other such identifier. If the correct version (or any version, in some implementations) is not stored in the local cache, the markup interpreter can proceed to step 340, which can include requesting and receiving a correct version of the script from a static content server. The markup interpreter can then proceed to store the received version of the script in the local cache at step 345. The markup interpreter can then proceed to step 350. If, at decision block 335, the markup interpreter successfully identified the correct version of the script in the local cache, the markup interpreter can proceed to step 350, which can include retrieving the correct version of the script from the local cache. The markup interpreter can then proceed to construct the modified content item with the inlined script at step 355. The markup interpreter can forward the modified content item to the webview for execution at step 360.

Still referring to FIG. 3, and in further detail, the method 300 can include a client computing device requesting content at step 305. The client computing device can transmit a request for content to a data processing system, a dynamic content server, a content provider, or other device or server. The client computing device can request digital content for presentation via an application executing on the client computing device. The application, or a portion thereof, can be executing in a sandboxed media environment that is siloed or has restricted access to other components or resources of the client computing device. The client computing device can transmit the request for content responsive to an instruction from an application executing on the client computing device. The application can request the digital content responsive to a trigger, condition, event, or interaction.

At step 310, the client computing device can receive the content item. The client computing device can receive the content item from the data processing system or the dynamic content server. In some implementations, the content item can include a reference to a script. The reference to the script can include a location of a source of the script. The location can include an identifier, pointer, link, hyperlink, uniform resource locator, or other indication of a location of the source of the script. The location of the source of the script can be remote from the client computing device (e.g., on the data processing system or other server remote from the client computing device and accessible via a network).

At step 315, a markup interpreter of the client computing device can intercept the content item. The markup interpreter can intercept the content item prior to the application, which is executing in the sandboxed media environment, that requested the content item receiving the content item. For example, a hooking component executing on the client computing device can intercept the content item and forward the content item to the markup interpreter. The hooking component can be configured to re-route or re-direct the content item to the markup interpreter. The interception may occur at any convenient or appropriate part of processing, such as in the network stack (e.g. at or below the application layer); after the content item has been written to memory or a buffer for the sandboxed media environment, but before a processing thread of the sandboxed media environment reads the content item; etc.

At step 320, the markup interpreter of the client computing device can parse the content item. The markup interpreter can parse the content item to extract an identifier of the script. The identifier can include a name of the script, a source location of the script, a version identifier of the script, a type of the script or a policy associated with the script, a creation date of the script, a modification date of the script, an expiration date of the script, a time-to-live for the script, and/or any other such information. The markup interpreter can use one or more patterns, regular expressions, rules, or templates to extract the information about the script.

At decision block 325, the markup interpreter can determine whether the content item includes a reference to a script. The markup interpreter can determine, based on parsing the content item, whether the content item includes a reference to a script (e.g. a script tag, an address of a script, etc.). If the content item does not include a reference to a script, as determined at decision block 325, the markup interpreter can proceed to forward the content item to a webview for execution or rendering, at step 330.

In some implementations, the markup interpreter can further determine whether the content item includes a reference to a script that matches a predetermined list of script that are approved for local caching. For example, the client computing device can include a predetermined list of scripts that are approved for local caching. If the content item does include a reference to a script, but the identified script is not in the predetermined list, then the content item can proceed to step 330 to forward the received content item to a webview for execution.

If the markup interpreter identifies a reference to a script in the content item at decision block 325, the markup interpreter can proceed to decision block 335. At decision block 335, the markup interpreter can determine whether the correct version of the script is stored in a local cache on the client computing device. The local cache can be separate from the sandboxed media environment in which the webview executes or the application, or portion thereof, executes. The markup interpreter can use the identifier of the script extracted from the content item during parsing at step 320 to query the local cache to check whether the version of the script stored in the local cache matches the version of the script indicated in the content item. If the markup interpreter determines, at decision block 335, that either the local cache does not include the same script, or the version of the script stored in the local cache does not match the version indicated by the content item, then the markup interpreter can proceed to step 340.

At step 340, the markup interpreter can transmit, via a network, a request for the correct version of the script or a current version of the script to the data processing system or a static content server. The data processing system, or static content server, can provide the correct version of the script responsive to the request. The client computing device can receive the correct or current version of the script and store the correct or current version of the script in the local cache at step 345. The markup interpreter can then proceed to step 350.

In the event the markup interpreter determines, at decision block 335, that the correct or current version of the script is already stored in the local cache, the markup interpreter can bypass steps 340 and 345, and proceed to step 350. At step 350, the markup interpreter can retrieve the correct or current version of the script from the local cache. The markup interpreter can use the identifier of the script extracted from the content item while parsing the content item at step 320 to retrieve the correct or current version of the script.

At step 355, the markup interpreter can construct a modified content item. The markup interpreter can construct the modified content item using the script retrieved from the local cache and the content item received from the dynamic content server. The markup interpreter can construct the modified content item by in-lining the script in the HTML of the content item in order to reduce RPCs to data processing system or a static content server corresponding to a source location indicated in the reference provided with the content item received at step 310.

At step 360, the markup interpreter can forward the modified content item for execution. The markup interpreter can forward the modified content item to the application executing on the client device in the sandboxed media environment to cause the application to execute the modified content item using the script in-lined in the HTML of the modified content item. For example, the markup interpreter can forward the modified content item to a webview for execution. After executing the content item to present the content item to a user, the client computing device can terminate the webview or terminate the application. Terminating the webview can include erasing or clearing contents of the webview, such as a sandbox environment or cache utilized by the webview or application. However, terminating the webview may not affect the contents of the local cache that is separate from the webview and used by the markup interpreter to store and retrieve scripts.

Thus, media content, such as video and audio, forms an increasingly important part of content provided in web pages and within applications. Some media content may be shown within its own media content environment (for example, within an instance of a WebView class used by a mobile operating system or a sandboxed media content environment). Once the media content has been played by the sandboxed media content environment, that media content environment may be destroyed, with new media content environments created to play new media content.

To allow for cross platform development and regular code updates to the media processing logic used to play media content within the media content environments (for example to improve functionality, security, etc.), media processing logic may be stored at a server (e.g., data processing system or dynamic content server) remote from a client computing device that is to play the media content. The media processing logic may therefore be fetched from the remote server by a media content environment. While some components of the media processing logic may be stored in a cache belonging to the media content environment, that cache may be destroyed with destruction of the media content. As such, media processing logic is obtained and loaded into memory each time media content is to be played within a media content environment. This may result in multiple and frequent round trip network calls, increasing latency, network traffic, memory usage and bandwidth requirements.

The present solution can provide a computer implemented method of providing content to the client computing device comprising one or more processors executing first computer readable instructions to cause the client computing device to provide a first content environment, the first content environment having a private (e.g., local) cache configured to store media processing logic comprising second computer readable instructions executable by the one or more processors to allow media to be provided within the first content environment. The client computing device can receive, by content pre-processing instructions (e.g., executing a markup interpreter) executing on the one or more processors, content associated with the first content environment. The client computing device can determine, by the content pre-processing instructions, that the content comprises a marker (e.g., a reference to a script for processing logic). The marker can be associated with an indication of media processing logic stored at a remote device (e.g., data processing system 112).

Responsive to determining that the content comprises the marker, the client computing device can determine, by the content pre-processing instructions, whether the media processing logic is stored in a local cache accessible to the content pre-processing instructions and/or the first content environment. In the event the markup interpreter determines that the media processing logic is not stored in the local cache, the markup interpreter can obtain the media processing logic from the remote device and store the media processing logic in the local cache. The markup interpreter can modify the received content to make the media processing logic accessible to the first content environment.

Thus, the markup interpreter can substantially (e.g., by a fraction of a second, 1 second, or more) reduce latency experienced when displaying media content within a content environment by allowing for media processing logic to be provided to each content environment from a local cache, as opposed to fetching media processing logic (such as JavaScript used to process video content) separately and individually from a remote source.

The markup interpreter can modify the received content processing logic by replacing the indication of the media processing logic stored at the remote device with an indication of the media processing logic stored in the local cache. The markup interpreter can modify the received content processing logic by storing the media processing logic in a RAM of the user device and replacing the indication of the media processing logic stored at the remote device with an indication of the media processing logic stored in the RAM of the user device. The markup interpreter can modify the received content processing logic by replacing the indication of the media processing logic stored at the remote device with some or all of the computer readable instructions of the media processing logic.

The marker (or reference or identifier of the script) can include a temporal indication (e.g., a version identifier or date). The markup interpreter can determine whether the media processing logic is stored in the local cache by comparing the temporal indication of the marker with a stored temporal indication stored in the local cache. In this way, the media processing logic can be updated with any desired frequency (e.g., daily or weekly) while providing each media content environment with the correct media processing logic for the received content.

Figure 4:
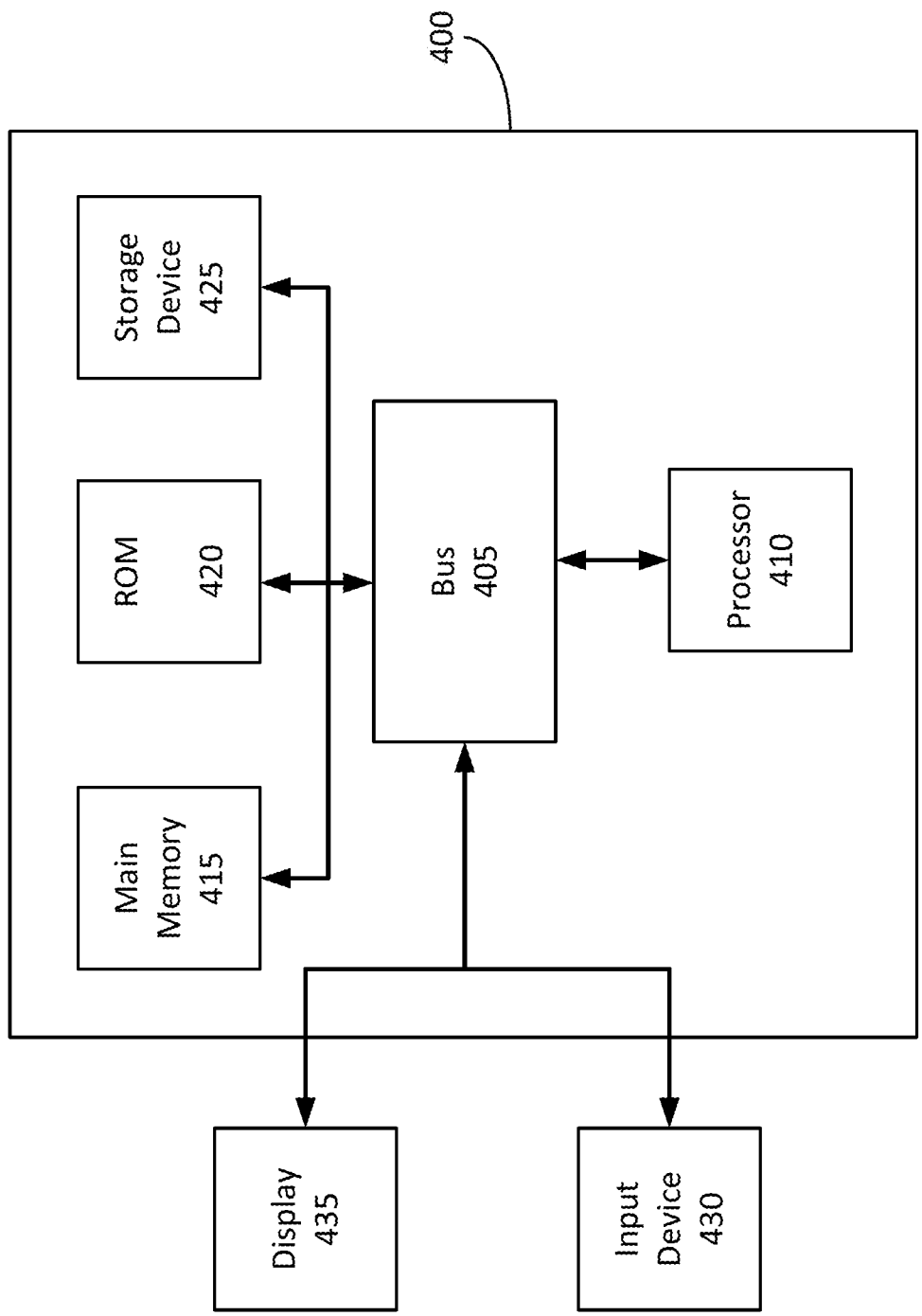
FIG. 4 is a block diagram illustrating an architecture for a computer system that may be employed to implement various elements of the systems shown in FIGS. 1 and 2, and the method shown in FIG. 3.

FIG. 4 is a block diagram of an example computer system 400. The computer system or computing device 400 can include or be used to implement the system 200, or its components such as the data processing system 112. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 104. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 104.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 112, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content selector component 218, dynamic content server 130, static content server 132 and other data processing system 112 components can include or share one or more data processing apparatuses, systems, computing devices, or processors. Further, the interface 202, markup interpreter 122, sandbox 204, application 104, and memory 206 and other client computing device 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 112) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 200 or system 400 can include clients and servers. A client and server are generally remote from each other and typically interact through a communication network (e.g., the network 205). The relationship of client and server arises by virtue of computer programs running on the respective computers and having a client-server relationship to each other. A server can transmit data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 112 from the computing device 102 or the content provider computing device 214 or the content publisher device 216).

Thus, aspects of the present disclosure are directed to systems and methods to reduce remote procedure calls in multimedia content delivery over a computer network. For example, the system can include a client device comprising one or more processors. The client device can have an interface and execute a markup interpreter. The interface can request, from a dynamic content server, digital content for presentation via an application executing on the client device in a sandboxed media environment. The interface can receive, responsive to the requesting, a content item comprising a reference to a script. The markup interpreter can intercept, prior to receipt by the application executing in the sandboxed media environment, the content item. The markup interpreter can parse the content item to extract an identifier of the script. The markup interpreter can identify, based on the identifier of the script, the script stored in a local cache on the client device separate from the sandboxed media environment. The markup interpreter can construct, based on the script stored in the local cache and the content item received from the dynamic content server, a modified content item. The markup interpreter can forward the modified content item to the application executing on the client device in the sandboxed media environment to cause the application to execute the modified content item.

In some implementations, the markup interpreter can parse the content item to identify a version of the script. The markup interpreter can determine that the version of the script indicated in the content item matches the version of the script stored in the local cache.

The client device can establish a first session for the application executing on the client device in the sandboxed media environment prior to the requesting the content item from the dynamic content server. The client device can terminate the first session subsequent to the application executing the modified content item. Terminating the first session can include clearing a cache corresponding to the sandboxed media environment.

The client device can establish a second session for the application executing on the client device in the sandboxed media environment. The second session can be established subsequent to termination of the first session. The client device can receive, responsive to a second request, from the dynamic content server, a second content item comprising the reference to the script. The markup interpreter can construct, based on the script stored in the local cache and the second content item received from the dynamic content server, a second modified content item. The markup interpreter can forward the second modified content item to the application executing on the client device in the sandboxed media environment to cause the application to execute the second modified content item in the second session.

The client device can establish a second session for the application executing on the client device in the sandboxed media environment. The client device can receive a second content item comprising a second reference to a second script. The markup interpreter can determine that the local cache separate from the sandboxed media environment does not have the second script. The markup interpreter can, responsive to the determination that the local cache does not have the second script, request the second script from a static content server. The markup interpreter can store the second script in the local cache separate from the sandboxed media environment. In some cases, the markup interpreter can construct, based on the second script stored in the local cache and the second content item received from the dynamic content server, a second modified content item. The markup interpreter can forward the second modified content item to the application executing on the client device in the sandboxed media environment to cause the application to execute the second modified content item. In some cases, the second script can include a different version of the script.

The markup interpreter can construct the modified content item by replacing the script in the content item with inline content corresponding to the script stored in the local cache. The modified content item can include hypertext markup language.

The client device can establish a second session for a second application executing on the client device in a second sandboxed media environment. The client device can receive a second content item comprising the reference to the script. The markup interpreter can identify the script in the local cache separate from the second sandboxed media environment. The markup interpreter can construct, responsive to identification of the script in the local cache and based on the script stored in the local cache and the second content item received from the dynamic content server, a second modified content item. The markup interpreter can forward the second modified content item to the second application executing on the client device in the second sandboxed media environment to cause the application to execute the second modified content item.

The markup interpreter can determine to store the script of the content item in the local cache based on a predetermined list of types of scripts enabled for storage in the local cache of the client device.

Accordingly, the systems and methods described herein provide for reducing remote procedure calls. In one aspect, the present disclosure is directed to a method of executing content in a sandboxed media environment. The method can include transmitting, by a client device to a dynamic content server, a request for content for presentation via an application executing on the client device in a sandboxed media environment. The method can include receiving, by the client device from the dynamic content server responsive to the request, a content item comprising a reference to a script. The method can include intercepting the content item by a markup interpreter executed by the client device. The markup interpreter can intercept the content item prior to receipt of the content item by the application executing in the sandboxed media environment. The method can include parsing the content item, by the markup interpreter, to extract an identifier of the script. The method can include retrieving the script, by the markup interpreter, from a local cache on the client device separate from the sandboxed media environment, according to the extracted identifier of the script. The method can include constructing a modified content item, by the markup interpreter, using the script retrieved from the local cache and the content item received from the dynamic content server. The method can include forwarding, by the markup interpreter to the application executing on the client device in the sandboxed media environment, the modified content item. The application can execute the modified content item.

In some implementations, the method can include parsing, by the markup interpreter, the content item to identify a version of the script. The markup interpreter can determine that the version of the script indicated in the content item matches the version of the script stored in the local cache.

In some implementations, the method can include establishing a first session for the application executing on the client device in the sandboxed media environment prior to the requesting the content item from the dynamic content server. The method can include terminating the first session subsequent to the application executing the modified content item. Terminating the first session can include clearing a cache corresponding to the sandboxed media environment.

In some implementations, the method can include establishing a second session for the application executing on the client device in the sandboxed media environment, the second session subsequent to termination of the first session. The method can include receiving, by the client device responsive to a second request, from the dynamic content server, a second content item comprising the reference to the script. The method can include constructing, by the markup interpreter using the script stored in the local cache and the second content item received from the dynamic content server, a second modified content item. The method can include forwarding, by the markup interpreter, the second modified content item to the application executing on the client device in the sandboxed media environment to cause the application to execute the second modified content item in the second session.

In some implementations, the method can include establishing a second session for the application executing on the client device in the sandboxed media environment. The method can include receiving, by the client device, a second content item comprising a second reference to a second script. The method can include determining, by the markup interpreter, that the local cache separate from the sandboxed media environment does not have the second script. The method can include, responsive to determining the local cache does not have the second script, requesting, by the markup interpreter, the second script from a static content server. The method can include storing, by the markup interpreter, the second script in the local cache separate from the sandboxed media environment.

In some implementations, the method can include constructing, by the markup interpreter using the second script stored in the local cache and the second content item received from the dynamic content server, a second modified content item. The method can include forwarding, by the markup interpreter, the second modified content item to the application executing on the client device in the sandboxed media environment to cause the application to execute the second modified content item.

In some implementations, the second script can include a different version of the script. In some implementations, the method can include constructing the modified content item by replacing the script in the content item with inline content corresponding to the script stored in the local cache. The modified content item can include hypertext markup language.

In some implementations, the method can include establishing a second session for a second application executing on the client device in a second sandboxed media environment. The method can include receiving, by the client device, a second content item comprising the reference to the script. The method can include identifying, by the markup interpreter, the script in the local cache separate from the second sandboxed media environment. The method can include responsive to identifying the script in the local cache, constructing, by the markup interpreter using the script stored in the local cache and the second content item received from the dynamic content server, a second modified content item. The method can include forwarding, by the markup interpreter, the second modified content item to the second application executing on the client device in the second sandboxed media environment to cause the application to execute the second modified content item.

In some implementations, the method can include determining to store the script of the content item in the local cache based on a predetermined list of types of scripts enabled for storage in the local cache of the client device.

In another aspect, the present disclosure is directed to a system to reduce remote procedure calls in multimedia content delivery over a computer network. The system can include a network interface. The system can include a processor executing an application in a sandboxed media environment and a markup interpreter. The system can include a storage device comprising a local cache storing at least one script. The network interface can transmit a request, to a dynamic content server, for content for presentation via an application executing on the client device in a sandboxed media environment. The network interface can receive, responsive to the requesting, a content item comprising a reference to a script. The markup interpreter can intercept, prior to receipt by the application executing in the sandboxed media environment, the content item. The markup interpreter can parse the content item to extract an identifier of the script. The markup interpreter can identify, based on the identifier of the script, the script stored in a local cache on the client device separate from the sandboxed media environment. The markup interpreter can construct, based on the script stored in the local cache and the content item received from the dynamic content server, a modified content item. The markup interpreter can forward the modified content item to the application executing on the client device in the sandboxed media environment to cause the application to execute the modified content item.

In some implementations, the markup interpreter is further configured to parse the content item to identify a version of the script. The markup interpreter can determine that the version of the script indicated in the content item matches the version of the script stored in the local cache.

In some implementations, the processor is configured to establish a first session for the application executing in the sandboxed media environment prior to the requesting the content item from the dynamic content server. The processor can terminate the first session subsequent to the application executing the modified content item. Terminating the first session can include clearing a cache corresponding to the sandboxed media environment.

In some implementations, the processor can establish a second session for the application executing on the client device in the sandboxed media environment, the second session established subsequent to termination of the first session. The processor can receive, responsive to a second request, from the dynamic content server, a second content item comprising the reference to the script. The markup interpreter can construct, based on the script stored in the local cache and the second content item received from the dynamic content server, a second modified content item. The markup interpreter can forward the second modified content item to the application executing on the client device in the sandboxed media environment to cause the application to execute the second modified content item in the second session.

In some implementations, the processor can establish a second session for the application executing on the client device in the sandboxed media environment. The processor can receive a second content item comprising a second reference to a second script. The markup interpreter can be further configured to determine that the local cache separate from the sandboxed media environment does not have the second script. The markup interpreter can, responsive to the determination that the local cache does not have the second script, request the second script from a static content server. The markup interpreter can store the second script in the local cache separate from the sandboxed media environment.

In some implementations, the markup interpreter can be further configured to construct, based on the second script stored in the local cache and the second content item received from the dynamic content server, a second modified content item. The markup interpreter can forward the second modified content item to the application executing on the client device in the sandboxed media environment to cause the application to execute the second modified content item.

In some implementations, the second script can include a different version of the script.

In some implementations, the markup interpreter is further configured to construct the modified content item by replacing the script in the content item with inline content corresponding to the script stored in the local cache, the modified content item comprising hypertext markup language.

In some implementations, the processor can be further configured to establish a second session for a second application executing on the client device in a second sandboxed media environment. The processor can receive a second content item comprising the reference to the script. The markup interpreter can be further configured to identify the script in the local cache separate from the second sandboxed media environment. The markup interpreter can, responsive to identification of the script in the local cache, construct, based on the script stored in the local cache and the second content item received from the dynamic content server, a second modified content item. The markup interpreter can forward the second modified content item to the second application executing on the client device in the second sandboxed media environment to cause the application to execute the second modified content item.

In some implementations, the markup interpreter is further configured to determine to store the script of the content item in the local cache based on a predetermined list of types of scripts enabled for storage in the local cache of the client device.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the gain adjustment component 204, or the content selector component 218, can be a single component, app, or program, or a logic device having one or more processing circuits, or part of one or more servers of the data processing system 112.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A'" and 'B' can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of executing content in a sandboxed media environment, comprising:
   transmitting, by a client device to a dynamic content server, a request for content for presentation via an application executing on the client device in a sandboxed media environment;
   receiving, by the client device from the dynamic content server responsive to the request, a content item comprising a reference to a script;
   intercepting the content item, by a markup interpreter executed by the client device separate from the sandboxed media environment, prior to receipt of the content item by the application executing in the sandboxed media environment;
   parsing the content item, by the markup interpreter, to extract an identifier of the script;
   retrieving the script, by the markup interpreter, from a local cache on the client device separate from the sandboxed media environment, according to the extracted identifier of the script;
   constructing a modified content item, by the markup interpreter, using the script retrieved from the local cache and the content item received from the dynamic content server; and
   forwarding, by the markup interpreter to the application executing on the client device in the sandboxed media environment, the modified content item, the application executing the modified content item.

2. The method of claim 1, comprising:
   parsing, by the markup interpreter, the content item to identify a version of the script; and
   determining, by the markup interpreter, that the version of the script indicated in the content item matches the version of the script stored in the local cache.

3. The method of claim 1, comprising:
   establishing a first session for the application executing on the client device in the sandboxed media environment prior to the requesting the content item from the dynamic content server; and
   terminating the first session subsequent to the application executing the modified content item, wherein terminating the first session comprises clearing a cache corresponding to the sandboxed media environment.

4. The method of claim 3, comprising:
   establishing a second session for the application executing on the client device in the sandboxed media environment, the second session subsequent to termination of the first session;
   receiving, by the client device responsive to a second request, from the dynamic content server, a second content item comprising the reference to the script; and
   constructing, by the markup interpreter using the script stored in the local cache and the second content item received from the dynamic content server, a second modified content item; and
   forwarding, by the markup interpreter, the second modified content item to the application executing on the client device in the sandboxed media environment to cause the application to execute the second modified content item in the second session.

5. The method of claim 1, comprising:
   establishing a second session for the application executing on the client device in the sandboxed media environment;
   receiving, by the client device, a second content item comprising a second reference to a second script;
   determining, by the markup interpreter, that the local cache separate from the sandboxed media environment does not have the second script;
   responsive to determining the local cache does not have the second script, requesting, by the markup interpreter, the second script from a static content server; and
   storing, by the markup interpreter, the second script in the local cache separate from the sandboxed media environment.

6. The method of claim 5, comprising:
   constructing, by the markup interpreter using the second script stored in the local cache and the second content item received from the dynamic content server, a second modified content item; and
   forwarding, by the markup interpreter, the second modified content item to the application executing on the client device in the sandboxed media environment to cause the application to execute the second modified content item.

7. The method of claim 5, wherein the second script comprises a different version of the script.

8. The method of claim 1, comprising:
   constructing the modified content item by replacing the script in the content item with inline content corresponding to the script stored in the local cache, the modified content item comprising hypertext markup language.

9. The method of claim 1, comprising:
establishing a second session for a second application executing on the client device in a second sandboxed media environment;
receiving, by the client device, a second content item comprising the reference to the script;
identifying, by the markup interpreter, the script in the local cache separate from the second sandboxed media environment;
responsive to identifying the script in the local cache, constructing, by the markup interpreter using the script stored in the local cache and the second content item received from the dynamic content server, a second modified content item; and
forwarding, by the markup interpreter, the second modified content item to the second application executing on the client device in the second sandboxed media environment to cause the application to execute the second modified content item.

10. The method of claim 1, comprising:
determining to store the script of the content item in the local cache based on a predetermined list of types of scripts enabled for storage in the local cache of the client device.

11. A system to execute content in a sandboxed media environment, comprising:
a client device comprising a network interface, a processor executing an application in a sandboxed media environment and a markup interpreter, and a storage device comprising a local cache storing at least one script;
wherein the network interface is configured to:
transmit a request, to a dynamic content server, for content for presentation via an application executing on the client device in a sandboxed media environment;
receive, responsive to the requesting, a content item comprising a reference to a script; and
wherein the markup interpreter is separate from the sandboxed media environment and is configured to:
intercept, prior to receipt by the application executing in the sandboxed media environment, the content item;
parse the content item to extract an identifier of the script;
identify, based on the identifier of the script, the script stored in a local cache on the client device separate from the sandboxed media environment;
construct, based on the script stored in the local cache and the content item received from the dynamic content server, a modified content item; and
forward the modified content item to the application executing on the client device in the sandboxed media environment to cause the application to execute the modified content item.

12. The system of claim 11, wherein the markup interpreter is further configured to:
parse the content item to identify a version of the script; and
determine that the version of the script indicated in the content item matches the version of the script stored in the local cache.

13. The system of claim 11, wherein the processor is configured to:
establish a first session for the application executing in the sandboxed media environment prior to the requesting the content item from the dynamic content server; and
terminate the first session subsequent to the application executing the modified content item, wherein terminating the first session comprises clearing a cache corresponding to the sandboxed media environment.

14. The system of claim 13, wherein:
the processor is further configured to:
establish a second session for the application executing on the client device in the sandboxed media environment, the second session established subsequent to termination of the first session;
receive, responsive to a second request, from the dynamic content server, a second content item comprising the reference to the script; and
the markup interpreter is further configured to:
construct, based on the script stored in the local cache and the second content item received from the dynamic content server, a second modified content item; and
forward the second modified content item to the application executing on the client device in the sandboxed media environment to cause the application to execute the second modified content item in the second session.

15. The system of claim 11, wherein:
the processor is further configured to:
establish a second session for the application executing on the client device in the sandboxed media environment; and
receive a second content item comprising a second reference to a second script; and
the markup interpreter is further configured to:
determine that the local cache separate from the sandboxed media environment does not have the second script;
responsive to the determination that the local cache does not have the second script, request the second script from a static content server; and
store the second script in the local cache separate from the sandboxed media environment.

16. The system of claim 15, wherein the markup interpreter is further configured to:
construct, based on the second script stored in the local cache and the second content item received from the dynamic content server, a second modified content item; and
forward the second modified content item to the application executing on the client device in the sandboxed media environment to cause the application to execute the second modified content item.

17. The system of claim 15, wherein the second script comprises a different version of the script.

18. The system of claim 11, wherein the markup interpreter is further configured to:
construct the modified content item by replacing the script in the content item with inline content corresponding to the script stored in the local cache, the modified content item comprising hypertext markup language.

19. The system of claim 11, wherein:
the processor is further configured to:
establish a second session for a second application executing on the client device in a second sandboxed media environment; and
receive a second content item comprising the reference to the script;
the markup interpreter is further configured to:
identify the script in the local cache separate from the second sandboxed media environment;
responsive to identification of the script in the local cache, construct, based on the script stored in the local cache and the second content item received from the dynamic content server, a second modified content item; and forward the second modified content item to the second application executing on the client device in the second sandboxed media environment to cause the application to execute the second modified content item.

20. The system of claim 11, wherein the markup interpreter is further configured to:
   determine to store the script of the content item in the local cache based on a predetermined list of types of scripts enabled for storage in the local cache of the client device.

* * * * *